United States Patent [19]

Dey et al.

[11] 4,238,552

[45] * Dec. 9, 1980

[54] ELECTROLYTE SALT FOR NON-AQUEOUS ELECTROCHEMICAL CELLS

[75] Inventors: Arabinda N. Dey, Needham; John S. Miller, Charleston, both of Mass.; William L. Bowden, Nashua, N.H.

[73] Assignee: P. R. Mallory & Co. Inc., Indianapolis, Ind.

[*] Notice: The portion of the term of this patent subsequent to Dec. 4, 1996, has been disclaimed.

[21] Appl. No.: 54,494

[22] Filed: Jul. 3, 1979

Related U.S. Application Data

[63] Continuation-in-part of Ser. No. 956,833, Nov. 2, 1978, Pat. No. 4,177,329.

[51] Int. Cl.³ .............................................. H01M 10/39
[52] U.S. Cl. ..................................... 429/101; 429/196
[58] Field of Search ................. 429/101, 105, 196, 194

[56] References Cited

U.S. PATENT DOCUMENTS

| | | | |
|---|---|---|---|
| 4,012,564 | 2/1979 | Auborn | 429/196 |
| 4,139,680 | 2/1979 | Schlaikjer | 429/196 |

Primary Examiner—Donald L. Walton
Attorney, Agent, or Firm—Ronald S. Cornell; Israel Nissenbaum; Martin M Glazer

[57] ABSTRACT

Novel electrolyte salts having high current carrying capability and which substantially prevent voltage delay in cells containing fluid depolarizers such as thionyl chloride ($SOCl_2$). The salts contain an alkali or alkaline earth metal cation and a halo-gallate indate or thallate anion. The salts additionally preferably contain a chalcogen such as oxygen, sulfur, selenium or tellurium therein.

17 Claims, No Drawings

ELECTROLYTE SALT FOR NON-AQUEOUS ELECTROCHEMICAL CELLS

This is a continuation-in-part of co-pending U.S. patent application Ser. No. 956,833 filed Nov. 3, 1978 now U.S. Pat. No. 4,177,329.

This invention relates to electrolyte salts for electrochemical cells particularly inorganic cells having fluid depolarizers such as thionyl chloride ($SOCl_2$) which cells are particularly susceptible to voltage delays.

Recently much effort has been expended in the development of high energy density cell systems which provide both higher voltages and total capacity (volumetric and gravimetric) than those of the Leclanche or alkaline cells having zinc anodes. The high energy density cell systems are centered around the use of active metals (metals above hydrogen in the EMF series which are unstable in aqueous environments) as anodes in non-aqueous solution cells. Lithium in particular has shown great promise as an anode material because of its high potential and low weight.

Various cell systems have been developed utilizing lithium as the anode electrode material. The ones showing the most promise in terms of voltage stability and high discharge capability, are those having fluid cathode depolarizers which also generally serve the dual function of electrolyte salt solvent and cathode depolarizer. When a cell of this type is not being discharged, the fluid depolarizer/electrolyte solvent reacts with the anode metal to a limited extent with a protective film coating being formed on the surface of the anode. Full reaction between the anode and fluid depolarizer with which it is in contact is thereby substantially prevented and cell self discharge is limited. Such cells are nevertheless operable since the protective film coating is dissipated during cell discharge. However, with the advantage of such film there is an inherent shortcoming whereby upon the onset of cell discharge, and depending upon cell storage and discharge conditions, there may be a lengthy "voltage delay" (defined as the amount of time to attain a specified voltage after the initial load) caused primarily by such film.

One of the most common fluid depolarizer/electrolyte solvents is thionyl chloride ($SOCl_2$) which, in combination with lithium, provides a cell couple having an exceedingly high voltage ($\sim 3.6$ volts), discharge capability, energy density, and stability of discharge. However, a limiting factor in the utility (especially with respect to high rate discharge) of cells containing a $Li/SOCl_2$ couple is the electrolyte salt used therein. Generally an electrolyte salt must fulfill several criteria. It should of course, have a high ionic or electrical conductivity for material transport upon cell discharge. The electrolyte salt should also be highly soluble in the fluid depolarizer/electrolyte solvent whereby such conductivity may be practically attained. Additionally, the electrolyte salt should be stable with respect to both the fluid depolarizer/electrolyte solvent and the anode metal. Electrolyte salts or solutes used in thionyl chloride depolarized cells are, for example, described at length in U.S. Pat. No. 3,926,669. Of the enumerated salts in the aforesaid patent the most preferred and the most widely used electrolyte salt or solute having the above described requisite properties, is lithium tetrachloroaluminate ($LiAlCl_4$). However, under abusive conditions, such as high temperature storage and low temperature discharge, cells containing lithium tetrachloroaluminate have been found to have substantial "voltage delays."

In the past, in order to alleviate the effects of such "voltage delays" the use of electrolyte salts other than $LiAlCl_4$ has been shown to be effective. The cloveborate salts of U.S. Pat. No. 4,020,240 (assigned to the same assignee as the present invention) if used as electrolyte salts substantially prevent "voltage delay." However, such salts which have relatively high conductivities are difficult to synthesize and are accordingly presently prohibitively expensive.

Recently an electrolyte salt, $Li_2Al_2Cl_6O$, has been utilized in preventing "voltage delays" in cells containing lithium anodes and thionyl chloride depolarizers. However, this salt has a relatively poor conductivity of about $5\times10^{-3}$ ohm$^{-1}$cm$^{-1}$ (for a 0.5 M solution in $SOCl_2$ at room temperature) with high discharge rate capability being curtailed thereby. By comparison a 1 M $LiAlCl_4$ in $SOCl_2$ solution has a conductivity of about $1.4\times10^{-2}$ ohm$^{-1}$cm$^{-1}$. Accordingly the advantage of substantial elimination of "voltage delay" is offset by the lower discharge rate capability.

It is an object of the present invention to provide novel electrolyte salts for non-aqueous electrochemical cells.

It is a further object of the present invention to provide novel electrolyte salts for cells subject to detrimental "voltage delays" which both alleviates such delays and which provides an adequately high conductivity for high rate discharge capability.

Generally the present invention comprises an electrolyte salt having an alkali or alkaline earth metal cation and a halo-gallate, indate or thallate anion and which preferably additionally contains a chalcogen such as oxygen, sulfur, selenium or tellurium therein.

In co-pending U.S. application Ser. No. 956,833 the utilization of a lithium chlorogallate electrolyte salt surprisingly provides higher conductivity and concomitant higher discharge rate capability when compared to the prior art utilized lithium chloroaluminate. Similarly it has been discovered that a lithium oxychlorogallate salt surprisingly provides a higher conductivity (approximately double) that of the lithium oxychloroaluminate salt above described. It is accordingly postulated that the halo-gallate, indate and thallate alkali and alkaline earth metal salts generally provide higher conductivities than those of analogous prior art chloro aluminates. Such conductivities are particularly important in inorganic cells such as those containing thionyl chloride depolarizer electrolyte solvents since commonly utilized electrolyte salts such as $LiClO_4$ which normally provide high conductivities in organic electrolyte cells are substantially insoluble in inorganic solvents. Current capability of such cells is thus normally curtailed because of the low conductivities of utilizable electrolyte salts therein.

The present invention generally encompasses halo-gallate, indate and thallate alkali and alkaline earth metal salts as electrolyte salts in non-aqueous cells. The alkali and alkaline earth metals provide the metallic cation necessary for material transport within the cell during cell discharge and the halo-gallate, indate or thallate anions help in preventing voltage delay which tends to plague fluid depolarized cells. Particularly effective in controlling the voltage delay in such cells are the oxyhalo-gallates, indates and thallates. In conjunction with the chlorine containing thionyl chloride depolarizers it is additionally preferable, for compatability purposes, that the halogen in the oxyhalo salts be similarly chlorine. Accordingly, the most preferred anions for the electrolyte salt of the present invention are $O(GaCl_3)_2^-$, $O(InCl_3)_2^-$, and $O(TlCl_3)_2^-$ when utilized in conjunction with a thionyl chloride or similar chlorine containing fluid depolarizers. The cation of the electrolyte salt is usually the same, though not necessarily (with the choice being dictated by compatibility consideration) as the cation of the anode metal electrode. Thus the metal cation in a cell containing a lithium anode would be $Li^+$ with the most preferred salts in a $Li/SOCl_2$ cell being $Li_2O(GaCl_3)_2$, $Li_2O(InCl_3)_2$ and $Li_2O(TlCl_3)_2$.

In addition to the oxychloro salts above described, the salts may generally comprise chalcohalo salts with sulfur, selenium or tellurium replacing the oxygen and with other halogens, fluorine, bromine or iodine replacing some or all of the chlorine.

The anodes useful in high energy density cells containing the novel electrolyte of the present invention include one or more of the aforementioned lithium and other alkali or alkaline earth metals such as sodium, potassium, rubidium, beryllium, magnesium, calcium and other metals above hydrogen in the EMF series.

The novel electrolyte salts of the present invention have particular utility in cells containing fluid depolarizer/electrolyte solvents such as aforementioned thionyl chloride which cells are subject to voltage delay and which are normally capable of being discharged at high rates. Examples of the other fluid depolarizer/electrolyte solvents include fluid oxyhalides, non-metallic oxides and non-metallic halides and mixtures thereof such as phosphorous oxychloride ($POCl_3$), selenium oxychloride ($SeOCl_2$), sulfur dioxide ($SO_2$), sulfur trioxide ($SO_3$) vanadium oxytrichloride ($VOCl_3$), chromyl chloride ($CrO_2Cl_2$), sulfuric oxychloride ($SO_2Cl_2$), Nitryl chloride ($NOCl$), nitrogen dioxide ($NO_2$), sulfur monochloride ($S_2Cl_2$) and sulfur monobromide ($S_2Br_2$). Each of the above can be used together with thionyl chloride ($SOCl_2$) as fluid depolarizer/electrolyte solvent or separately.

Though the above electrolyte salts have been described for particular utility in fluid cathode depolarizer/electrolyte solvent cells they may be utilized in other cells requiring electrolyte salts such as those containing solid cathodes such as metal chromates and dichromates, vanadates, molybdates, halides, oxides, permanganates, iodates and carbon monofluoride and organic electrolyte solvents such as tetrahydrofuran, propylene carbonate, dimethyl sulfite, dimethyl sulfoxide, N-nitrosodimethylamine, gamma-butyrolactone, dimethyl carbonate, methyl formate, butyl formate, dimethoxyethane, acetonitrile and N,N-dimethyl formamide.

The salts of the present invention are utilized in the same manner as prior art cells whereby they are simply dissolved in the electrolyte salt solvent to the desired concentration. Alternatively they may be preferably prepared in situ. The following examples, set forth, by way of illustration, the preparation of a salt of the present invention, the testing of its stability with respect to cell components and its performance in electrochemical cells generally. It is understood that the following examples are for illustrative purposes only, with the invention not to be limited thereby.

EXAMPLE 1

A 0.5 M solution of $Li_2(GaCl_3)_2$ is prepared by dissolving sufficient $GaCl_3$ in $SOCl_2$ to provide a 1 M solution. To this 1 M $GaCl_3$—$SOCl_2$ solution is added $Li_2O$ powder in a proportion of 0.5 moles of $Li_2O$ for each mole of $GaCl_3$ in the solution. The mixture is refluxed to yield a clear light amber fluid with all of the $Li_2O$ being thereby dissolved. The conductivity of the solution is thereafter measured at room temperature and is found to be $1.05 \times 10^{-2}$ ohm$^{-1}$cm$^{-1}$.

It is presumed that the reaction which forms the electrolyte salt, having the stoichiometric formula $Li_2O(GaCl_3)_2$, is an acid-base neutralization between the lithium oxide ($Li_2O$), as a base, and the aprotic Lewis acid, $GaCl_3$. The $Li_2O(GaCl_3)_2$ has substantially greater conductivity than either $GaCl_3$ or $Li_2O$ alone.

EXAMPLE 2

The 0.5 M $Li_2O$ $(GaCl_3)_2$—$SOCl_2$ electrolyte of Example 1 is refluxed with shiny pieces of lithium metal therein for about 12 hours at 85° C. The lithium pieces remain untarnished indicating the compatibility of the electrolyte with the lithium.

EXAMPLE 3

Hermetic D cells are made by winding a Li anode (on a nickel Exmet collector) having the dimensions 11.5" (29.2 cm)×2" (5.1 cm)×0.03" (0.08 cm) with a carbon cathode (on a nickel Exmet collector) having the dimensions 10" (25.4 cm)×1.75" (4.4 cm)×0.015" (0.04 cm) (three ply and total—0.045" (0.12 cm)) and two layers of glass filter separators therebetween into a cylindrical spool. The spool is placed into a D size container (OD: 1.30" (3.3 cm) L: 2.38" (6.0 cm) with 43 gms of the 0.5 $Li_2O(GaCl_3)_2$—$SOCl_2$ electrolyte solution of Example 1. The cell is discharged at 25° C. at 0.01, and 0.1 and 1.0 amps with voltages of 3.65, 3.50 and 3.25 respectively. The open circuit voltage of the cell is about 3.65 volts. The above polarization characteristics indicate the generally low internal resistance of the cell and high discharge rate capability at relatively stable voltages.

EXAMPLE 4

Cells such as in Example 3 are stored at about 70° C. for 30 days and are discharged at rates of 1.0 Amp at temperatures of about $-20°$ C. The cells show no significant voltage delays to 2 volts.

EXAMPLE 5

Cells as in Example 3 are discharged at rates of 1.0 Amp at room temperature after storage for 30 days at 70° C. and show no significant voltage delays to 3 volts.

The above examples are for illustrative purposes only. It is understood that changes and variations with respect to cell components utilized with the electrolyte salts of the present invention may be made without departing from the scope of the present invention as defined in the following claims.

What is claimed is:

1. A non-aqueous electrochemical cell comprising an anode, above hydrogen in the EMF series, a cathode depolarizer and a dissolved electrolyte salt wherein said salt contains an alkali or alkaline earth metal cation and an anion selected from the group consisting of halo-gallates, halo-thallates and mixtures thereof.

2. The cell of claim 1 wherein said anion further includes a chalcogen selected from the group consisting of oxygen, sulfur, selenium and tellurium.

3. The cell of claim 2 wherein said chalcogen comprises oxygen.

4. The cell of claim 3 wherein said cathode depolarizer is selected from the group consisting of fluid oxyhalides, non-metallic oxides, non-metallic halides and mixtures thereof.

5. The cell of claim 4 wherein said cathode depolarizer is selected from the group consisting of $SOCl_2$, $POCl_3$, $SeOCl_2$, $SO_2$, $SO_3$, $VOCl_3$, $CrO_2Cl_2$, $SO_2Cl_2$, $NOCl$, $NO_2$, $S_2Cl_2$, $S_2Br_2$ and mixtures thereof.

6. The cell of claim 5 wherein said cathode depolarizer comprises $SOCl_2$.

7. The cell of claim 6 wherein said halo constituent comprises chlorine.

8. The cell of claim 7 wherein said cation is comprised of lithium.

9. A non-aqueous electrochemical cell comprising a lithium anode, a fluid cathode depolarizer and a dissolved electrolyte salt selected from the group consisting of $Li_2O(GaCl_3)_2$, $Li_2O(InCl_3)_2$, and $Li_2O(TlCl_3)_2$.

10. The cell of claim 9 wherein said depolarizer comprises $SOCl_2$.

11. The cell of claim 10 wherein said electrolyte salt comprises $Li_2O(GaCl_3)_2$.

12. A non-aqueous electrochemical cell comprising an anode above hydrogen in the EMF series, a cathode depolarizer selected from the group consisting of fluid oxyhalides, non-metallic oxides, non-metallic halides and mixtures thereof and a dissolved electrolyte salt wherein said salt contains an alkali or alkaline earth metal cation and an anion selected from the group consisting of halo-gallates, halo-indates, halo-thallates and mixtures thereof.

13. The cell of claim 12 wherein said anion further includes a chalcogen selected from the group consisting of oxygen, sulfur, selenium and tellurium.

14. The cell of claim 12 wherein said cathode depolarizer is selected from the group consisting of $SOCl_2$, $POCl_3$, $SeOCl_2$, $SO_2$, $SO_3$, $VOCl_3$, $CrO_2Cl_2$, $SO_2Cl_2$, $NO_2$, $SZ_2Cl_2$, $S_2Br_2$ and mixtures thereof.

15. The cell of claim 14 wherein said cathode depolarizer comprises $SOCl_2$.

16. The cell of claim 15 wherein said halo constituent comprises chlorine.

17. The cell of claim 16 wherein said cation is comprised of lithium.

* * * * *